Dec. 14, 1943.  F. U. ANDERSON  2,336,452
TRAILER MOUNTING DEVICE
Filed Dec. 26, 1941  3 Sheets-Sheet 1

INVENTOR
F. U. Anderson
BY
Webster & Webster
ATTYS

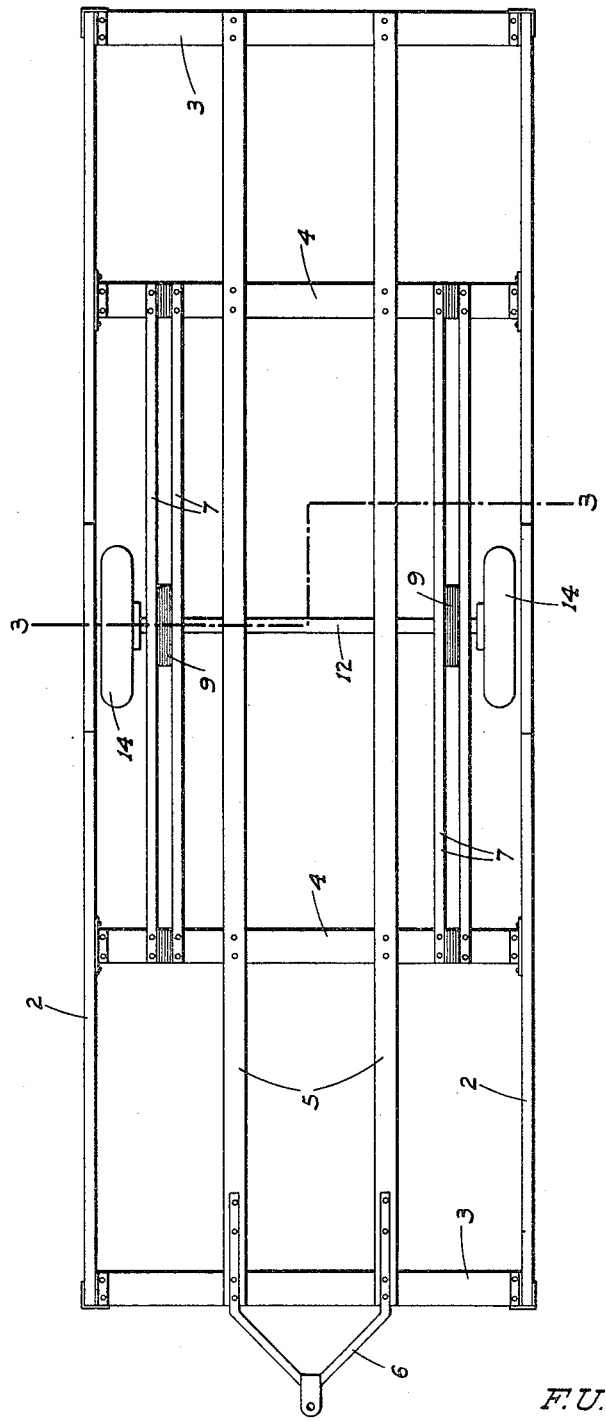

Dec. 14, 1943.  F. U. ANDERSON  2,336,452
TRAILER MOUNTING DEVICE
Filed Dec. 26, 1941  3 Sheets-Sheet 3

INVENTOR
*F.U.Anderson*
BY
*Corbet Corbet*
ATTYS

Patented Dec. 14, 1943

2,336,452

UNITED STATES PATENT OFFICE 2,336,452

TRAILER MOUNTING DEVICE

Frank U. Anderson, Stockton, Calif.

Application December 26, 1941, Serial No. 424,523

1 Claim. (Cl. 280—124)

This invention relates generally to a wheel mounting assembly for vehicles and in particular is directed to a wheel mounting assembly for house trailers.

The principal object of my invention is to provide a wheel mounting assembly for house trailers arranged so that the body of the trailer may be lowered to a level and stable ground engaging position when desired, thus relieving the weight on the tires when the trailer is to remain in one place for a period of time. My invention also avoids the necessity of using a plurality of jacks and supporting blocks as is now commonly done to maintain the house body trailer in a steady and tire relieving position.

This application includes the subject matter of my allowed abandoned application, Serial No. 139,964, filed April 30, 1937.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 2 is a top plan of the trailer chassis showing the special framing arrangement.

Figure 1:
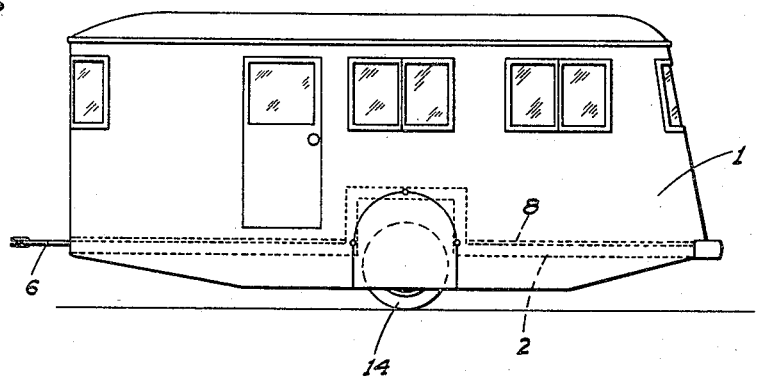
Figure 1 is a side elevation of a house trailer embodying my invention.
Figure 4:
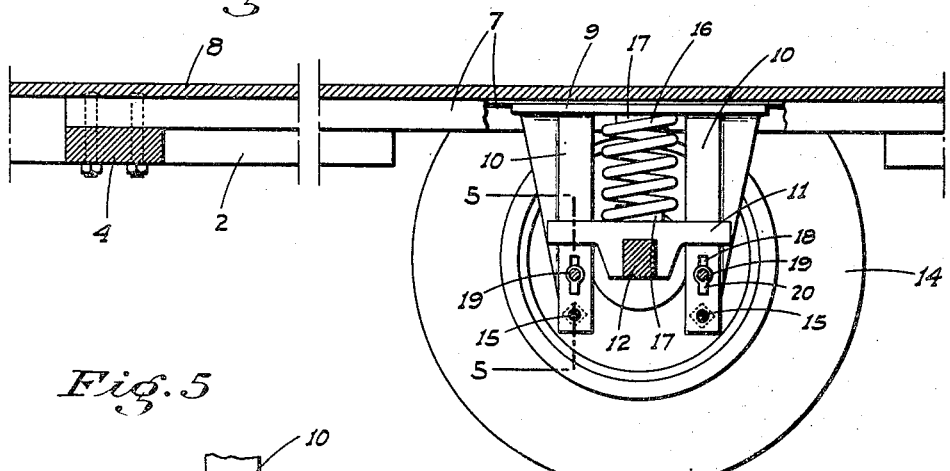
Figure 4 is a fragmentary longitudinal section on line 4—4 of Fig. 3.

Referring now more particularly to the characters of reference on the drawings, the body of the house trailer, indicated generally at 1, is mounted on a framing of special construction. This framing comprises side sills 2 set on edge, connected as well by end cross members 3 and intermediate cross members 4 of lesser height than the sills. Longitudinal transversely spaced stringers 5 extend the full length of the framing between sills 2 and rest on and are supported by the cross members. The drawerbar unit 6 is connected to the stringers and projects forwardly therefrom.

Pairs of longitudinal angle irons 7, disposed in inverted and facing relation, extend between and are secured on cross members 4, each pair being located between a stringer and the adjacent sill. The sills, angle irons and stringers are disposed so that their upper surface is on a common level, providing a firm support for the flooring 8.

The angle irons centrally of their ends support the wheels in the manner hereinafter described, the load being transmitted to the cross members 4 and the latter being so disposed relative to the framing as to substantially balance the latter on the two wheels, and so as to give a very even distribution of the load on the frame.

Figure 5:
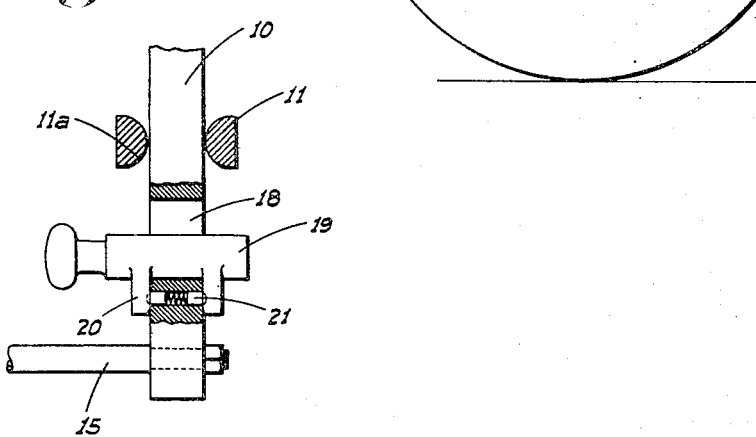
Figure 5 is a fragmentary cross section on line 5—5 of Fig. 4, showing one of the stop pins as mounted in position.
Figure 3:
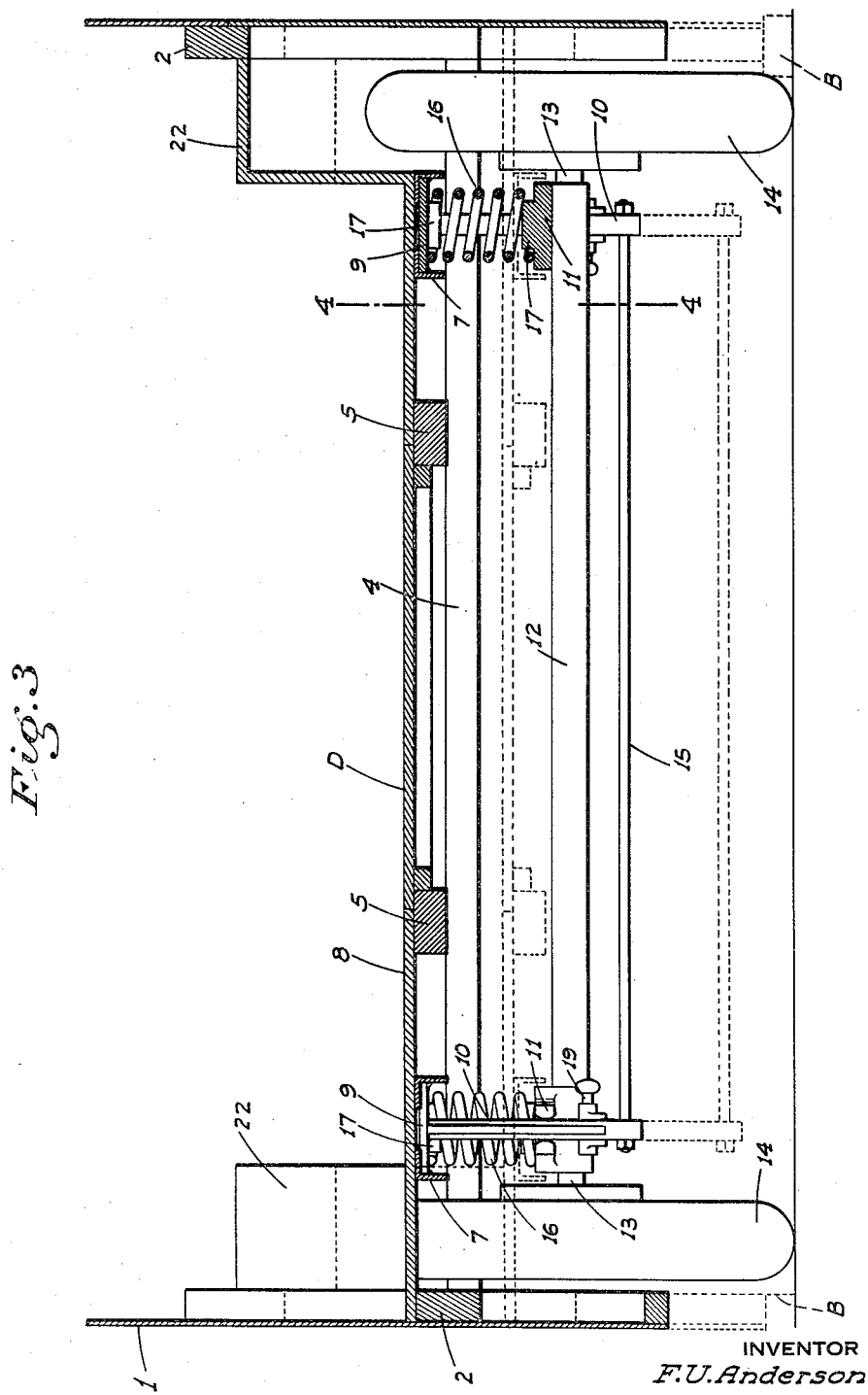
Figure 3 is an enlarged transverse section on line 3—3 of Fig. 2, showing the wheel mounting mechanism.

A pair of wheel mounting hangers is provided, each including a horizontal plate 9 fitting between and welded to angles 7, and a pair of depending parallel guide bars 10 spaced lengthwise of the horizontal plate. The guide bars of each hanger are substantially rectangular in section and freely extend through openings or slots in a cross member 11; said cross member being slidably disposed on said bars. If desired, the bar engaging faces of the cross members may be rounded as shown at 11a in Fig. 5 in order to facilitate sliding movement of the cross members up and down the guide bars.

A horizontal transversely extending axle 12 is mounted between the cross members 11 and is rigidly fixed thereon, said axle being formed at each end with spindles 13 which project beyond the hangers. Pneumatic-tired vehicle wheels 14 of standard construction are mounted on the spindles. The rods 15 are connected between the lower ends of corresponding guide bars of the hangers.

A heavy duty compression spring 16 is disposed vertically between each horizontal plate 9 and cross member 11; said spring being normally under compression and held in place by locating elements 17 which project a short distance into the adjacent coils of the spring from both the horizontal plate 9 and cross member 11. The guide bars 10 adjacent their lower ends but above the point of connection of the guide bars with the tie rods are formed with transverse keyhole slots 18 which are adapted to receive stop pins 19 therethrough. Each stop pin comprises a pair of spaced laterally projecting ears 20 adapted to engage the adjacent portion of the guide bar closely therebetween after the stop pin has been inserted through the keyhole slot and turned to a bar engaging position. A spring pressed detent 21 is engaged by the ears 20 when the stop pin has been turned through an arc of approximately 180°; said detent preventing accidental rotation and loss of the pin from the keyhole slot.

When my improved wheel mounting assembly is in use, the weight of the body of the house trailer maintains springs 16 under compression and prevents escape of said spring from the locaters 17. When the trailer is in transit, the wheels 14 may move up and down due to road shock, etc., said shock being absorbed by the springs 16. Of course with such movement the cross members 11 slide up and down the guide bars 10. In the event that the trailer encounters exceedingly rough roads and the trailer body tends to bounce, the stop pins 19 prevent the cross members 11 from moving down the guide bars 10 sufficient distance to permit the escape of springs 16 from locaters 17.

When it is desired to lower the body of the trailer to a level and ground engaging position, the stop pins 19 are first removed from keyhole slots 18 and the trailer body then jacked up which raises guide bars 7 relative to cross members 8. After the guide bars have been raised sufficient distance relative to cross members 11, the springs 16 may be then removed from the locaters. As tie rods 15 extend between the lower ends of guide bars 10, it is impossible for cross members 11 to escape from the guide bars during such spring removing operation. After the springs 16 are removed, the body of the trailer is lowered until it rests upon blocks B on the ground, such lowering of the body being unrestricted by the wheels as the cross members 11 which support the wheel axle then freely slide up the guide bars. Wheel receiving housings 22 project upwardly from the floor, and the sills 2 are arched about the wheels as shown to prevent interference and allow removal of the wheels or tires when necessary.

A trapdoor D in the floor 8 over the axle affords access to the wheel mounting units and to the stop pins 19 for the removal of the latter by the operator.

From the foregoing description it will be readily seen that I have produced such a device as substantially fulfills the objects of the invention as set forth herein.

While this specification sets forth in detail the present and preferred construction, still in practice such deviations from such detail may be resorted to as do not form a departure from the spirit of the invention, as defined by the appended claim.

Having thus described my invention what I claim as new and useful and desire to secure by Letters Patent is:

In a wheel mounting assembly which includes a pair of wheels, an axle on which said wheels are mounted, spaced guide members secured on the axle between the wheels, a hanger for each guide member, said hanger including a pair of depending guide bars between which the corresponding guide member is slidably mounted in guided relation, an upstanding helical compression spring mounted between each guide member and the upper end of the corresponding hanger between the guide bars thereof, and locating elements longitudinally releasably engaging each spring at its ends to prevent displacement thereof in a horizontal direction when said spring is under compression; the guide bars of each hanger depending below the corresponding guide member, when the spring is compressed, a distance sufficient to allow of relatively downward movement of the guide members to a position to relieve the springs of all compression and clear said elements from the ends of said springs while the guide members remain on the guide bars and whereby the springs may be withdrawn from position without resistance, stop elements mounted in connection with the guide bars below said position arranged to limit downward movement of the guide members and prevent escape of said members from the hangers, and other stop elements removably mounted in connection with the bars of the hangers normally below said guide members but disposed to limit downward movement of said guide members to a point short of said spring removing position of the guide members and a distance insufficient to relieve the spring of all compression.

FRANK U. ANDERSON.